United States Patent
Wilkerson et al.

[11] Patent Number: 5,820,141
[45] Date of Patent: Oct. 13, 1998

[54] ONE MAN CARRIER AND BACK PACK

[76] Inventors: Charles William Wilkerson, deceased, late of New Bern, N.C.; by Peggy A. Wilkerson, executrix, 902 Spar Ct., New Bern, N.C. 28560

[21] Appl. No.: 770,512

[22] Filed: Dec. 20, 1996

[51] Int. Cl.$^6$ .................. B62B 1/00; B62B 1/12
[52] U.S. Cl. ................ 280/30; 280/47.3; 280/47.33
[58] Field of Search .................. 280/47.3, 47.31, 280/1.5, 47.32, 47.33, 30

[56] References Cited

U.S. PATENT DOCUMENTS

| | | | |
|---|---|---|---|
| 910,728 | 1/1909 | Russell | 296/20 |
| 2,416,492 | 2/1947 | Neeley | 280/47.3 |
| 2,811,367 | 10/1957 | Goodale | 280/645 |
| 2,918,296 | 12/1959 | Goodale | 280/47.3 |
| 2,967,058 | 1/1961 | Hoffmann, Jr. | 280/30 |
| 3,054,622 | 9/1962 | Davis et al. | 280/47.3 |
| 3,236,537 | 2/1966 | Eckman | 280/47.3 |
| 3,820,807 | 6/1974 | Curran | 280/47.3 |
| 4,593,841 | 6/1986 | Lange | 224/153 |
| 5,005,844 | 4/1991 | Douglas et al. | 280/1.5 |
| 5,215,318 | 6/1993 | Capraro | 280/1.5 |
| 5,244,217 | 9/1993 | Kotulla | 280/1.5 |
| 5,460,307 | 10/1995 | Stevenson | 224/153 |

*Primary Examiner*—Brian L. Johnson
*Assistant Examiner*—Bridget Avery
*Attorney, Agent, or Firm*—Mills Law Firm PLLC

[57] ABSTRACT

A collapsible carrier including an inflatable roller assembly for transporting a load such as a downed game animal or an injured person in remote areas over rough terrain is disclosed. The collapsible carrier includes a generally rectangular load supporting frame fabricated from light-weight, tubular material. The load supporting frame includes forward and rear frame sections being interconnected by a pair of triangular support frame members extending therebetween and being adapted for sliding, telescoping engagement with the forward and rear frame sections permitting convenient assembly or disassembly of the carrier. The carrier includes a cylindrical, inflatable roller assembly having axial bearings which is fabricated from a flexible fabric material capable of containing compressed air and adapted to be transversely mounted between the support frame members. The bearings are configured and dimensioned for insertion within an elongated tube extending through the roller assembly being retained therein when the roller is in an inflated condition. In an alternative embodiment the roller is provided with an elongated solid axle which extends therethrough and is adapted for attachment to the support frame members imparting rotational movement to the roller. The carrier may be grasped using handles attached thereto by the user in a conventional manner or, in the alternative, may be secured about the waist of the user with an optional harness belt. The collapsible carrier may be conveniently disassembled into its component parts for storage within a conventional mountaineer's back pack until it is deployed.

9 Claims, 3 Drawing Sheets

ONE MAN CARRIER AND BACK PACK

BACKGROUND OF INVENTION

1. Field of Invention

This invention relates to wheeled carts and, more particularly, to a collapsible carrier including an inflatable roller which breaks down for storage in a conventional back pack.

Wheeled carriers and carts for carrying parcels and luggage are well known to those skilled in the art. Such a carrier typically includes a lightweight framework having a platform-like structure whereon the luggage or other load is supported. A pair of wheels is attached to the distal end of the frame, and a pair of generally horizontal arms extend from the proximal end of the frame toward the user.

Such a cart may be held in the hands and arms of the user or may be adapted for attachment to the user's waist with a strap. For example, U.S. Pat. No. 4,236,723 to Lemmon discloses a wheeled cart designed to carry a load to be pulled behind the user when strapped to the user's waist or hips.

Although such wheeled carts are useful on paved surfaces for carrying items such as parcels and luggage, they are of little use on rough, natural terrain or inaccessible wilderness areas.

Thus, there is a need for a collapsible wheeled carrier which is suitable for transport over rough terrain by users such as hunters carrying downed game or rescue workers carrying injured persons in remote areas.

2. Description of Related Prior Art

U.S. Pat. No. 3,693,993 to Peter Mazzarelli et al. discloses a convertible beach tote cart including a framework of a pair of frames hinged together for pivoting in either direction so that the cart can serve as a cot or lounging chair, the frames supporting webbed areas therein, each of the frames being supportable in an elevated position above the ground by downwardly pivotable legs, and one end of the framework forming a pull handle while the other end is supported on a rollable cylinder for traveling over the ground.

U.S. Pat. No. 2,613,953 to Cash E. Giovannoni discloses a mono-wheel harness for use by hunters and others for pulling mono-wheeled vehicles for carrying packs and game and the like.

U.S. Pat. No. 4,236,723 to John A. Lemmon discloses a hip cart designed to carry a load and to be pulled behind a user when strapped to the user's waist or hips. The cart contains a generally upright, adjustable-length load-support frame being mounted at one end thereof on a pair of wheels.

U.S. Pat. No. 5,005,844 to George V. Douglas, et al. discloses a travois with roller assembly for carrying camping supplies and the like comprising an elongated support frame mounted over an enlarged roller assembly having a spherically shaped profile and a pair of pushing handles extending rearwardly and upwardly from the travois. Attached to the handles is a pulling harness which is connectable to a user thereof.

U.S. Pat. No. 2,918,296 to Ralph H. Goodale discloses a one-wheeled portable carrier in which the handles and supporting struts or braces for the wheels are foldable to a position alongside of the frame whereby the entire apparatus may be easily strapped to a single person for transport of the carrier.

U.S. Pat. No. 3,073,614 to Carl E. Zinneman discloses a combination game cart and chair adapted for use by hunters for carrying downed game animals and which is foldable into an extremely small backpack. The combination game cart and chair is adaptable for other purposes such as a lightweight boat carrier, an outboard motor carrier, a golf club carrier and a utility carrier for sportsmen.

U.S. Pat. No. 3,236,537 to Alfred J. Eckman discloses a collapsible trail cart including a hammock-type stretcher suspended on a collapsible and convertible frame which is supported by a single wheel for transporting small loads over difficult terrain, narrow trails and over various distances.

U.S. Pat. No. 2,924,831 to George D. Hankins discloses a combination stretcher and mountaineer's back pack frame which may be readily disassembled and collapsed to form a neat and useful frame analogous to a mountaineer's back pack frame.

U.S. Pat. No. 3,486,671 to Grover E. Sanders discloses a litter back pack assembly designed for transporting combat casualties including a vest-type main body section secured to the upper extremities of the body by a plurality of strap members and having downwardly depending connector straps releasably connected to outer ends of support poles of the litter which may be carried by two persons, each wearing the litter back pack assembly of this invention.

U.S. Pat. No. 3,771,809 to Patrick Cam discloses a device for transporting loads on uneven or shifting ground, and also for launching small boats including a supporting chassis equipped with adjustable means of support so that it can adapt to the configuration of the profile of the load to be transported. The supporting chassis is provided with at least one pair of wheels wider than they are high, with a curved exterior bearing surface.

Finally, U.S. Pat. No. 2,541,928 to Peter B. Loomis is considered of general interest in that it discloses an inflatable roller for moving heavy objects such machinery, pianos and the like which rolls freely on extremely irregular surfaces and soft or sandy ground.

SUMMARY OF INVENTION

After much research and study into the above mentioned problems, the present invention has been developed to provide a collapsible carrier including an inflatable roller assembly for use by hunters and rescue workers for transporting a load such as a downed game animal or injured person over rough terrain where access by conventional wheeled carts is impractical.

The carrier includes a generally rectangular load supporting frame comprised of a plurality of lightweight, tubular frame sections and a transversely mounted, inflatable roller assembly attached to one end thereof.

The tubular frame members are adapted for telescoping connection between adjacent frame sections providing for convenient disassembly and storage within a conventional mountaineer's back pack.

The collapsible carrier is provided with a pair of outwardly extending handles which may be held in the hands and arms of the user or, in the alternative, may be attached to a harness belt to enable the carrier to be transported in a balanced condition attached to the waist of the user.

In view of the above, it is an object of the present invention to provide a collapsible carrier including an inflatable roller assembly which is suitable for transport over rough terrain by users such as hunters carrying downed game or rescue workers carrying injured persons in remote areas.

Another object of the present invention is to provide a collapsible carrier including a generally rectangular load supporting frame comprised of a plurality of frame members adapted for telescoping connection with adjacent frame members which may be conveniently disassembled by the average user for storage in a conventional mountaineer's back pack.

Another object of the present invention is to provide a collapsible carrier including an inflatable roller assembly fabricated from a durable, light-weight weight material which is easily inflated by a standard air pump during use of the carrier and, in the alternative, easily deflated for storage in the back pack when not in use.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
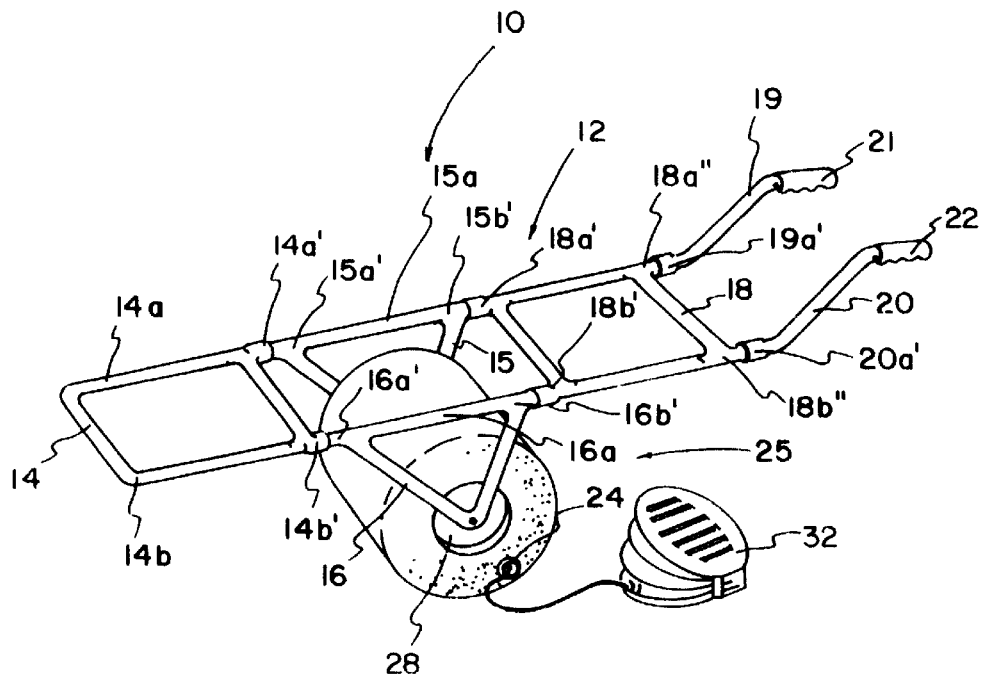
FIG. 1 is a perspective view of the carrier of the present invention showing an air-pump attached to the inflatable roller.

With reference to the drawings, there is shown therein a collapsible carrier with an attached roller assembly illustrated in FIG. 1, indicated generally at 10.

The carrier 10 includes a generally rectangular, load-supporting frame, indicated generally at 12, and a transversely mounted roller assembly, indicated generally at 25.

Frame 12 is comprised of a plurality of component sections, namely a forward frame section 14, a rear frame section 18 and a pair of generally triangular-shaped roller support frame members 15 and 16 extending therebetween. Frame 12 further includes a pair of rigid, generally horizontal arm members 19 and 20 which extend from the rear frame section 18 toward the user at an angle to be grasped in the hands.

Arm members 19 and 20 may include a pair of hand grips 21 and 22 for the comfort and convenience of the user.

In the preferred embodiment frame sections 14 and 18 together with roller support frame members 15 and 16 are fabricated from a lightweight tubing material such as plastic or aluminum. The forward frame section 14 is generally rectangular in configuration and includes a pair of connecting tube members 14a' and 14b' which are integrally formed therewith and extend in axial alignment with the lateral sections 14a' and 14b' of frame section 14.

The connecting tube members and 14a' and 14b' are adapted to receive extension members 15a' and 16a' of support frame members 15 and 16 in telescoping engagement therein as shown ill FIG. 1.

Figure 2:
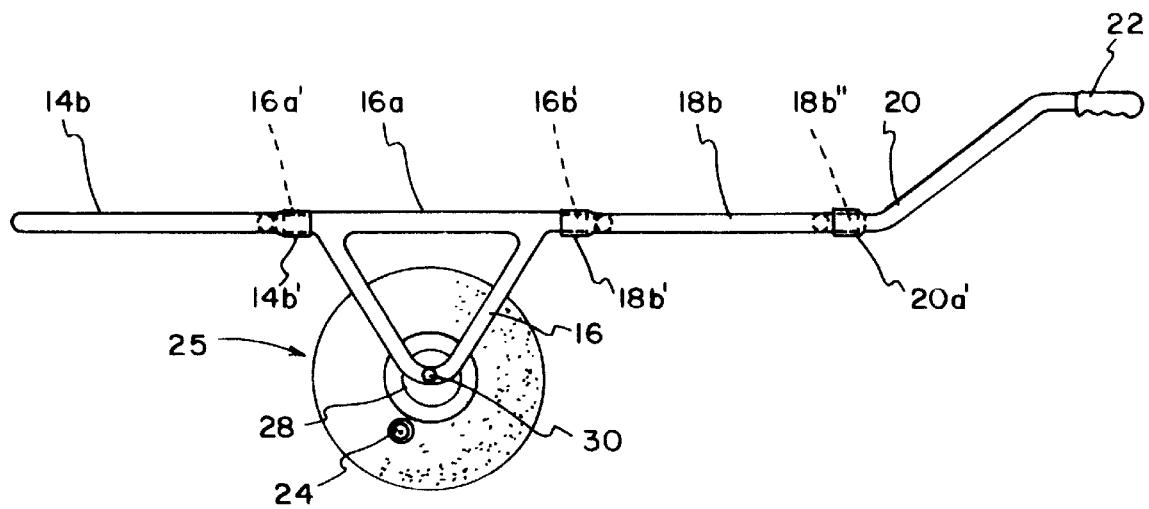
FIG. 2 is a side elevational view of the carrier of the present invention.

Similarly, the opposite ends of frame support members 15 and 16 are provided with extension members 15b' and 16b' which are adapted for telescoping engagement within connecting tubes 18a' and 18b' formed on the lateral sections 18a and 18b of rear frame section 18 as more clearly shown in FIG. 2.

In similar fashion the opposite ends of rear frame section 18 are provided with extension members 18a" and 18b" which are adapted for telescoping engagement with connecting tubes 19a' and 20a' respectively of arm members 19 and 20.

Once assembled as described hereinabove, the roller support frame members 15 and 16 are rotated downwardly to a generally vertical parallel position to permit the installation of roller 25 thereon as seen in FIG. 1.

In the preferred embodiment roller 25 is an inflatable cylinder fabricated from a durable material such as 840 denier nylon of a suitable weight and thickness to support the maximum capacity load for the carrier 10. The nylon material is coated on both sides with a sealant such as urethane or other suitable material to render the same airtight for inflation purposes.

Roller 25 includes a standard air valve 24 integrally attached thereto for connection to a conventional air pump such as foot pump 32 as shown in FIG. 1.

Since such air valves and pumps are well known to those skilled in the art, further detailed discussion of the same is not deemed necessary.

Figure 3:
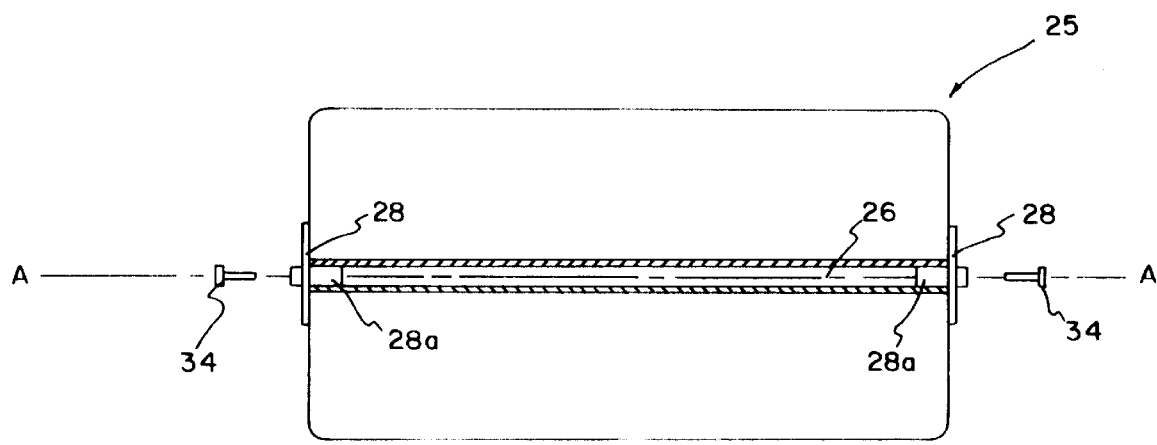
FIG. 3 is a cross-sectional view of the roller assembly of the present invention showing the details of the structure thereof.

The roller 25 includes an elongated central tube 26 integrally formed therein which is disposed about a longitudinal axis A of roller 25 wherein a pair of plastic bearings 28 are installed at either end thereof as shown in FIG. 3.

In the preferred embodiment bearings 28 are generally disc-shaped in configuration and include a stub axle 28a being integrally formed therewith and projecting therefrom in generally perpendicular relation thereto.

Stub axle 28a is formed to a pre-determined diameter that is approximately the same size as the inside diameter of the central tube 26 to provide an interference fit therebetween when the roller 25 is inflated and the stub axles 28a are installed therein.

Bearings 28 are adapted to be pivotally mounted on bolts 34 within a pair of mounting apertures 30 formed in coaxial relation within the lowermost portions of the triangular support frame members 15 and 16. Thus, the roller 25 is adapted for rotating movement therebetween as shown in FIG. 1.

In an alternative embodiment roller 25 is adapted for use with an axle 27 which is configured and dimensioned to extend through the central tube 26 and being adapted for attachment to support frame members 15 and 16.

Figure 4:
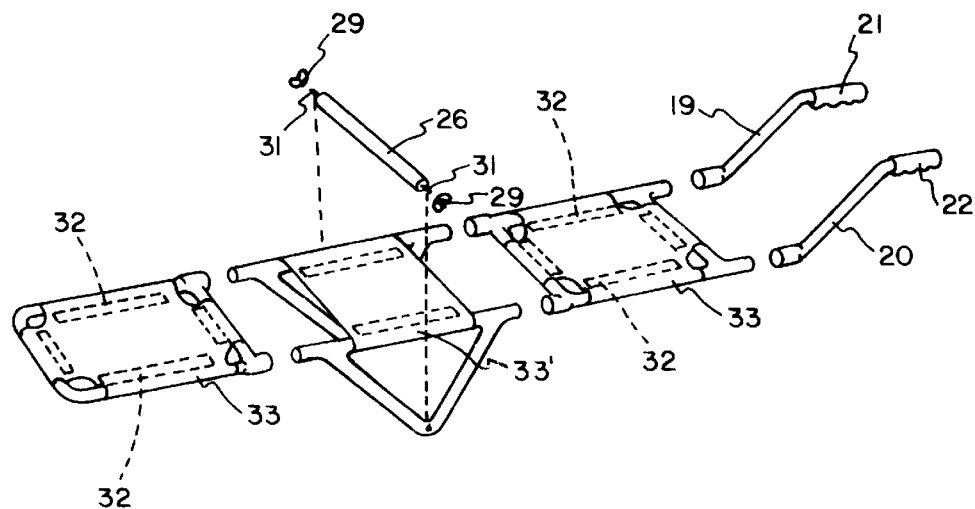
FIG. 4 is a partially exploded, perspective view of the load-supporting frame of the carrier of the present invention.

Axle 26 includes threaded stud portions 31 which are secured within apertures 30 with mating wing nuts 29 as shown in FIG. 4.

When inflated to a pre-determined pressure by foot pump 32, the roller 25 enables convenient transport of the carrier 10 over rough terrain while supporting a load thereon.

Still referring to FIG. 4, there is shown therein a partially exploded view of the carrier 10. It can be seen that the frame sections 14, 15 and 16, and 18 are each provided with a webbed fabric panel 33 or 33' that is disposed within the peripheral edges of the respective frame sections and secured thereto using a suitable fastening means.

In the preferred embodiment the webbed fabric panels 33 and 33' disposed within each frame section 14 and 18 and extending between sections 15 and 16 are secured thereto by the use of mating portions of hook and loop type fasteners 32 sold under the trade name Velcro.

Since such Velcro fasteners are well known to those skilled in the art, further detailed discussion of the same is not deemed necessary.

Figure 5:
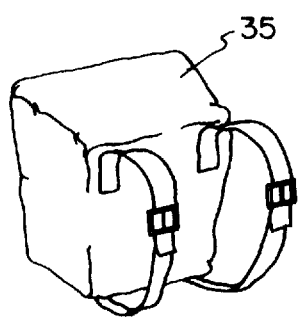
FIG. 5 is a perspective view of a conventional back pack wherein the carrier of the present invention is stored in a disassembled condition.

It can be seen that the carrier 10 present invention may be conveniently disassembled into its constituent components as shown in FIG. 4 and disposed within a conventional backpack 35 as illustrated in FIG. 5. In this manner the carrier 10 may be conveniently stored within the backpack 35 and carried on the back of a hunter, rescue worker, or other user of the same when hunting or working in remote areas which are inaccessible to the conventional wheeled carts of the prior art.

In practical use, the components of the carrier 10 may be conveniently removed from the backpack 35 and assembled by slidingly engaging the telescoping parts of the frame 12 in the manner described hereinabove.

Thereafter, the roller 25 is inflated using the foot pump 32 or other conventional hand-operated air pump (not shown) and installed on the roller support frame members 15 and 16 as previously described.

Figure 6:
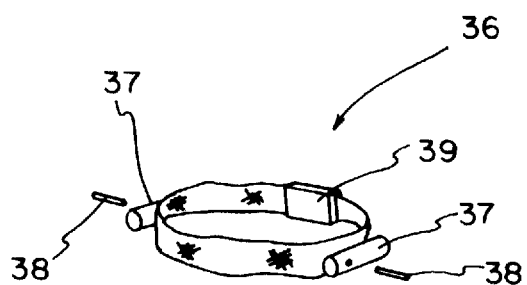
FIG. 6 is a perspective view of the harness belt used in combination with the carrier of the present invention showing the details thereof.

The carrier 10 of the present invention may be utilized in conjunction with a harness belt, indicated generally at 36, as shown in FIG. 6. Belt 36 includes a pair of cylindrical sockets 37 which are adapted to receive the distal ends of arm members 19 and 20 therein. Once installed, the distal ends of arm members 19 and 20 may be locked therein by means of locking pins 38 or other suitable fastening means.

Belt 36 also includes a quick-release buckle 39 in the event that the user must disconnect the carrier 10 during use.

The hip belt 36 enables a user of carrier 10 to transport the same in a balanced condition while reducing stress on the back and arm muscles and having the hands free to carry other items if necessary.

From the above it can be seen that the carrier of the present invention provides a practical, lightweight conveyance for use by hunters and rescue workers for transporting a load such as downed game animals or injured persons through rough terrain where access by conventional wheeled carts is impractical.

The carrier of the present invention features a collapsible support frame which may be quickly and conveniently assembled by the average user having ordinary mechanical skills.

In addition, the carrier features an inflatable roller fabricated from a durable nylon material which permits the carrier to be transported over rough terrain for use by hunters and rescue personnel.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A collapsible carrier for transporting small loads across rough terrain comprising: a rectangular forward frame section formed of a light-weight tubular material, said forward frame section having a pair of laterally spaced tubular sections having projecting tubular ends; a tubular collar received over said projecting tubular ends and connected thereto, said tubular collar adapted to telescopically receive and rotationally support said tubular material; a rectangular rear frame section formed of said light-weight tubular material, said rear frame section having a pair of laterally spaced tubular sections having projecting tubular ends at both ends thereof; a tubular collar received over said projecting tubular ends and connected thereto, said collar adapted to telescopically receive and rotationally support said tubular material; a pair of generally triangular support frames formed of said light-weight tubular material, each of said support frames having an upper leg with projecting tubular ends, said tublar ends being telescopically receivable in the collars of said rear frame section and said forward frame section and rotatably supported thereby, each of said support frames having converging lower legs having an aperture formed therein, said support frames being assembled to said front frame member and said rear frame member by inserting said projecting ends into said collar and rotating said converging lower legs into parallel spaced alignment said forward frame section, said rear frame section and said support frames being provided with a webbed fabric panel whereby said load may be carried thereon; a pair of arm members formed of said light-weight tublar material, said arm members having one end for grasping by a user of the carrier and a collar at the other end adapted to telescopically receive said other end of said forward frame section; said arms being adapted for attachment to a harness belt including a pair of cylindrical socket means being mechanically coupled thereto, said harness belt being worn about the waist of a user of said carrier enabling the same to be transported in a balanced condition while attached about said waist of said user; a generally cylindrical, inflatable roller having an elongated tube coaxially carried therewith; said roller being fabricated from a durable fabric material capable of retaining compressed air; bearing means having one end connected to said tube and another end rotatably supported in said aperture in said lower legs of said support frame, said bearing means including a disc-shaped bearing having a cylindrical stub axle integrally formed therewith and extending thereform in perpendicular relation thereto, said axle being adapted for insertion within said tude at one end thereof and being adapted for attachment to said support frames at the opposite end thereof imparting rotational movement to said roller means mounted therbetween; and fastener means for connecting said bearing means to said support frame while accommodating rotational movement of said inflatable roller whereby said carrier to be transported by a user thereof over rough terrain while carrying said load thereon.

2. A collapsible carrier for transporting small loads across rough terrain comprising:
   a rectangular forward frame section formed of a light-weight tubular material, said forward frame section having a pair of laterally spaced tubular sections having projecting tubular ends; a tubular collar received over said projecting tubular ends and connected thereto, said tubular collar adapted to telescopically receive and rotationally support said tubular material;
   a rectangular rear frame section formed of said light-weight tubular material, said rear frame section having a pair of laterally spaced tubular sections having projecting tubular ends at both ends thereof; a tubular collar received over said projecting tubular ends and connected thereto, said collar adapted to telescopically receive and rotationally support said tubular material;

a pair of generally triangular support frames formed of said light-weight tubular material, each of said support frames having an upper leg with projecting tubular ends, said tubular ends being telescopically receivable in the collars of said rear frame section and said forward frame section and rotatably supported thereby, said supports having converging lower legs having an aperture formed therein, said support frame members being assembled to said front frame member and said rear frame member by inserting said projecting ends into said collar and rotating said converging lower legs into parallel spaced alignment;

a pair of arm members formed of said light-weight tubular material, said arm members having one end for grasping by a user of the carrier and a collar at the other end adapted to telescopically receive said other end of said forward frame section;

a generally cylindrical, inflatable roller having an elongated tube coaxially carried therewith;

bearing means having one end connected to said tube and another end rotatably supported in said aperture in said lower legs of said support frame; and fastener means for connecting said bearing means to said support frame while accommodating rotational movement of said inflatable roller whereby said carrier to be transported by a user thereof over rough terrain while carrying said load thereon.

3. The collapsible carrier as recited in claim 2 wherein said forward frame section, said rear frame section and said support frames are provided with a webbed fabric panel being disposed within the periphery of said forward and rear frame sections and extending between said support frames whereby said load may be carried thereon.

4. The collapsible carrier as recited in claim 3 wherein said roller is fabricated from a durable fabric material capable of retaining compressed air.

5. The collapsible carrier as recited in claim 4 wherein said bearing means includes a disc-shaped bearing having a cylindrical stub axle integrally formed therewith and extending therefrom in perpendicular relation thereto, said axle being adapted for insertion within said tube at one end thereof and being adapted for attachment to said support frames at the opposite end thereof imparting rotational movement to said roller means mounted therebetween.

6. The collapsible carrier as recited in claim 5 wherein said bearing means further includes an elongated axle configured and dimensioned to extend through said tube, said elongated axle being adapted for attachment to said support frames.

7. The collapsible carrier as recited in claim 6 wherein said arms are adapted for attachment to a harness belt including a pair of cylindrical socket means being mechanically coupled thereto, said harness belt being worn about the waist of a user of said carrier enabling the same to be transported in a balanced condition while attached about said waist of said user.

8. The collapsible carrier as recited in claim 7 wherein said load supporting frame together with said roller means may be disassembled and stored within a conventional back pack until deployed.

9. A method of deploying a collapsible carrier having a generally rectangular, load supporting frame means including a generally rectangular forward frame section and generally rectangular rear frame section, said forward and rear frame sections being interconnected to a pair of generally triangular shaped support frame members at first mating telescopic portions, said rear frame section being further interconnected to a pair of arm members projecting outwardly from said rear frame section toward a user of said carrier at second mating telescopic portions, said carrier further including a generally cylindrical, inflatable roller means including an elongated tube means being integrally formed therewith and radially disposed about a longitudinal axis of said roller means, said tube means being adapted to receive bearing means therein, said bearing means being configured and dimensioned to be retained within said tube means in an inflated condition thereof, said roller means together with said bearing means being adapted for rotating movement between said support frame members, said carrier being adapted for storage within a back pack in a disassembled condition thereof, said method comprising steps of:

unpacking said forward frame section, said rear frame section, said support frame members, said arm members, said roller means, and said bearing means from said back pack;

telescopically assembling said forward frame section and said rear frame section to said support frame members at said first mating telescopic connections to assemble said load supporting frame means;

telescopically assembling said arm members to said rear frame section at said second mating telescopic connections;

inflating said roller means using a conventional air pump;

inserting said bearing means within said tube means in functional relation thereto;

installing said roller means together with said bearing means intermediate said support frame members thereby imparting rotational movement to said roller means and enabling said carrier to be transported by a user thereof while carrying a load thereon.

* * * * *